(12) United States Patent
Roth

(10) Patent No.: US 12,248,834 B2
(45) Date of Patent: Mar. 11, 2025

(54) INTEGRATION OF RFID TECHNOLOGY INTO MANAGEMENT OF PRODUCTS

(71) Applicant: Avery Dennison Retail Information Services LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 125 days.

(21) Appl. No.: 17/642,376

(22) PCT Filed: Sep. 11, 2020

(86) PCT No.: PCT/US2020/050501
§ 371 (c)(1),
(2) Date: Mar. 11, 2022

(87) PCT Pub. No.: WO2021/050947
PCT Pub. Date: Mar. 18, 2021

(65) Prior Publication Data
US 2022/0327347 A1   Oct. 13, 2022

Related U.S. Application Data

(60) Provisional application No. 62/899,560, filed on Sep. 12, 2019.

(51) Int. Cl.
*G06K 19/077* (2006.01)
*G06K 7/10* (2006.01)
(Continued)

(52) U.S. Cl.
CPC ... *G06K 19/07758* (2013.01); *G06K 7/10366* (2013.01); *G06K 19/0723* (2013.01); *G06Q 10/087* (2013.01)

(58) Field of Classification Search
CPC ......... G06K 19/07758; G06K 7/10366; G06K 19/0723; G06Q 10/087
See application file for complete search history.

(56) References Cited

U.S. PATENT DOCUMENTS

| 6,982,640 B2 | 1/2006 | Lindsay et al. |
| 7,495,558 B2 * | 2/2009 | Pope ........................ G01K 3/04 340/572.1 |

(Continued)

OTHER PUBLICATIONS

International Search Report and Written Opinion dated Nov. 18, 2020 issued in corresponding IA No. PCT/US2020/050501 filed Sep. 11, 2020.

(Continued)

*Primary Examiner* — Kam Wan Ma

(57) ABSTRACT

In some embodiments, a product management system includes at least one receiving location configured to receive a product associated with at least one smart device encoded with a unique identifier. The product management system further includes a reader system configured to receive a first signal transmitted from the at least one smart device, determine a time measurement, determine a state of the product based at least in part on a time measurement, and transmit a second signal based on the state of the product. The product management system further includes at least one display associated with the product and configured to receive the second signal from the reader system, and generate a visual indication of the state of the product based at least in part on the second signal.

13 Claims, 7 Drawing Sheets

(51) Int. Cl.
*G06K 19/07* (2006.01)
*G06Q 10/087* (2023.01)

(56) References Cited

U.S. PATENT DOCUMENTS

| | | | |
|---|---|---|---|
| 7,617,132 B2 | 11/2009 | Reade et al. | |
| 2004/0100380 A1 | 5/2004 | Lindsay et al. | |
| 2004/0139101 A1 | 7/2004 | Watanabe et al. | |
| 2005/0134461 A1 | 6/2005 | Gelbman et al. | |
| 2007/0251521 A1* | 11/2007 | Schackmuth | G06Q 50/12 126/369 |
| 2007/0273507 A1* | 11/2007 | Burchell | G01K 3/04 340/572.1 |
| 2017/0004335 A1 | 1/2017 | Russell et al. | |
| 2017/0293968 A1* | 10/2017 | Russell | G06Q 10/087 |
| 2019/0080280 A1* | 3/2019 | Tingler | G06K 7/10475 |
| 2019/0095663 A1* | 3/2019 | Ayette | G06K 7/10366 |
| 2020/0334628 A1* | 10/2020 | Goldberg | G06Q 30/0633 |

OTHER PUBLICATIONS

International Preliminary Report on Patentability dated Mar. 15, 2022 issued in corresponding IA No. PCT/US2020/050501 filed Sep. 11, 2020.

* cited by examiner

INTEGRATION OF RFID TECHNOLOGY INTO MANAGEMENT OF PRODUCTS

CROSS-REFERENCE TO RELATED APPLICATION

The present application is a 371 of international Application No. PCT/US2020/050501, which was published in English on Mar. 18, 2021, and claims the benefit of U.S. Provisional Patent Application No. 62/899,560 filed Sep. 12, 2019, both of which are incorporated herein by reference in their entireties.

BACKGROUND

The present subject matter relates to management of objects such as, but not limited to, commercial products. More particularly, the present subject matter relates to the incorporation of RFID technology into product management systems for commercial products.

Products in a retail environment, such as food products may go through multiple stages with critical timing during processing and packaging. For food products, timing may affect proper taste and quality.

For example, pork belly may go through one or more of a brining, pressing, and smoking process before being rendered into sliced bacon to be purchased. Some systems also include a storage stage during which a partially prepared food product is placed into a cooler or other storage facility as part of the production process. In the case of a brined/smoked food item, the amount of time spent in the storage facility may be critical because it may be necessary to store the item for minimum amount of time (e.g., to allow meat to become sufficiently firm for slicing). For example, meat may be rendered grind-quality-only if stored for more than three days, assuming that the meat has not deteriorated to the point that it must be treated as waste. In another example, fruits and vegetables may go through many stages (picking, cleaning, cooking, etc.) prior to landing on a consumer's table, during which time during each stage is important to prevent unnecessary spoilage.

Although freshness is of the utmost importance, waste may still result from lack of proper tracking through the various stages of preparation. For example, a container containing a food product may be placed at a location in a storage facility without being properly identified or tracked. In facilities with high volume in-and-out movement of food products, facility operators may be prone to simply grab what is most convenient instead of what is properly in queue. Although some conventional systems may use location tracking, operators may still inadvertently pick up newer items and allow older items to expire. Accordingly, improvements may still be made over conventional systems.

SUMMARY

There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In an aspect, a product management system includes at least one receiving location configured to receive a product associated with at least one smart device encoded with a unique identifier. The product management system further includes a reader system configured to receive a first signal transmitted from the at least one smart device, determine a time measurement, determine a state of the product based at least in part on a time measurement, and transmit a second signal based on the state of the product. The product management system further includes at least one display associated with the product and configured to receive the second signal from the reader system, and generate a visual indication of the state of the product based at least in part on the second signal.

In various embodiments, at least one smart device may be attached to a container that comprises the product. The system may determine a time measurement by evaluating when the first signal was received from the at least one smart device. The system may determine a time measurement by evaluating data stored by the at least one smart device. The system may be configured to recognize at least three different product states, at least one of which includes a holding state in which the product should be held for additional time before further processing. At least one of the product states may include being ready for processing for a first food product. At least one of the product states may include being ready for processing for a second food product. The processing for a first food product may include cutting the product. The first food product may include bacon, and the second food product may include bacon bits. The management system may include a cooler. The at least one smart device may include an RFID device.

In various embodiments, at least one RFID device may be encoded with information regarding the product, and wherein the product is a food product. The information regarding the product may include at least one of time and date information. The reader system may include a database configured to store the unique identifier and to associate the unique identifier with information regarding the product. The display may include at least one of a plurality of differently colored lights, with each colored light being associated with a different condition of the food product, a light configured to alternately display a plurality of different colors, with each color is associated with a different state of the product, and a screen configured to generate different images each indicative of a different state of the product. The reader system may be configured to track movement of a food product associated with the smart device based at least in part on receipt of the signal from the smart device by different readers at different times. The system may include a plurality of low-power BLUETOOTH® devices positioned at different locations within the facility, and at least one of the BLUETOOTH® devices is configured to receive the first signal.

In another aspect, a method of managing products may include, using a reader system, receiving a first signal from a smart device encoded with a unique identifier, determining a time measurement, determining a state of the product based at least in part on the time measurement, and transmitting a second signal indicative of the state of the product. The method further includes, using at least one display associated with the product, receiving the second signal, and generating a visual indication of the state of the product based at least in part on the second signal.

In various embodiments, the smart device may be attached to a container that comprises the product. In addition, determining a time measurement may include evaluating when the first signal was received from the at least one smart device. Also, determining a time measurement may include evaluating data stored by the smart device. Determining the state may include recognizing at least one of three different product states, at least one of the three states being a holding state in which the product should be held for additional time before further processing. At least one of the product states may include being ready for processing for a first food product. At least one of the product states may include being ready for processing for a second food product.

In various embodiments, the processing for a first food product may include cutting the product. The first food product may include bacon, and the second food product may include bacon bits. The reader system may be used in connection with a cooler. The smart device may include an RFID device. The RFID device may be encoded with information regarding the product, and wherein the product is a food product. The information regarding the product may include at least one of time and date information. The method may include, using a database, storing the unique identifier and associating the unique identifier with information regarding the product.

In various embodiments, the at least one display may include at least one of (e.g., one of or a combination of) 1) a plurality of differently colored lights, with each colored light being associated with a different condition of the food product, 2) a light configured to alternately display a plurality of different colors, with each color is associated with a different state of the product, and a 3) screen configured to generate different images each indicative of a different state of the product. The method may include tracking movement of a food product associated with the smart device based at least in part on receipt of the signal from the smart device by different readers at different times. The reader system further may include a plurality of low-power BLUETOOTH® devices positioned at different locations within the facility, and the first signal may be received using at least one of the BLUETOOTH® devices. The method may include associating the product with a receiving location at a facility using the smart device encoded with a unique identifier.

DESCRIPTION OF THE ILLUSTRATED EMBODIMENTS

It is to be understood that the disclosed embodiments are merely exemplary of the disclosure, which may be embodied in various forms. Therefore, specific details disclosed herein are not to be interpreted as limiting, but merely as a basis for the claims and as a representative basis for teaching one skilled in the art to variously employ the present disclosure in virtually any appropriate manner.

This disclosure includes systems and methods that may help with rapid identification and location of products. For example, some exemplary systems may use RFID devices to help locate products and to determine a product state based on a time measurement. A state indicator may be used to show to operators, persons, or other users what the state or location is for a particular product or group of products as determined based on the RFID device 28 and the time measurement. For some additional embodiments, different indicators may show different states. Such state indicators may be useful for facilitating processing, manufacturing, storage, commerce, or other processes.

Figure 1:
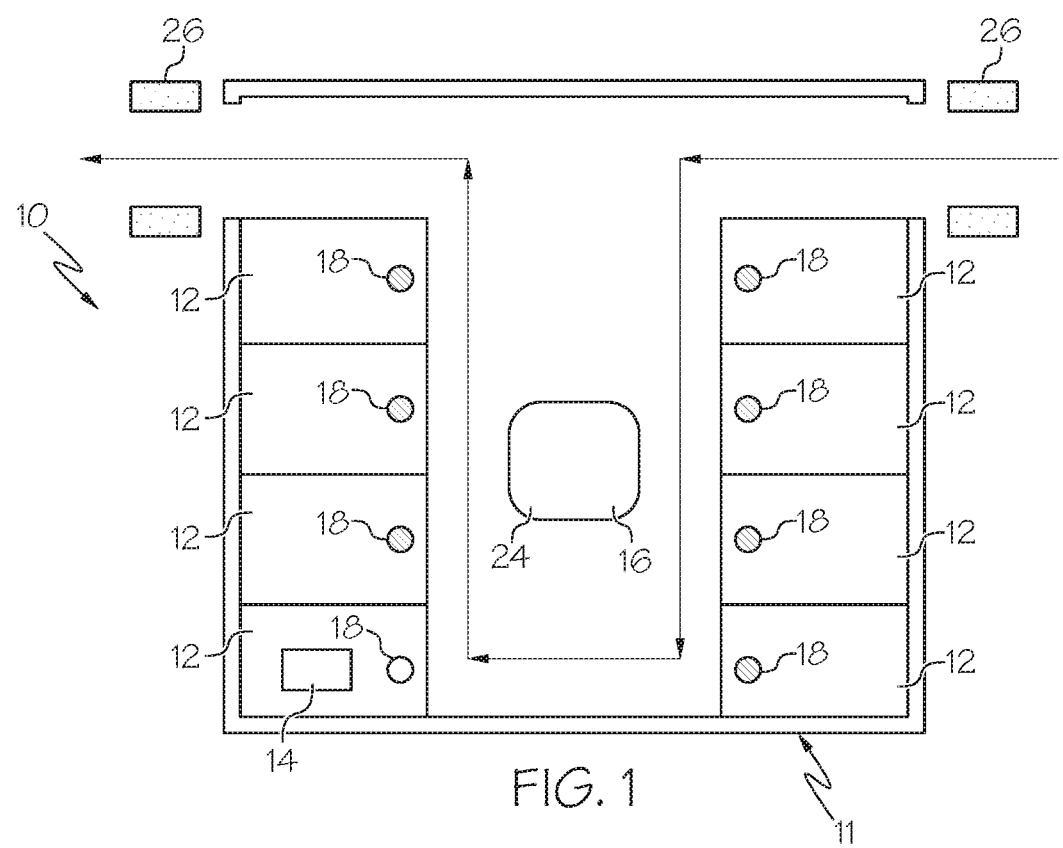
FIGS. 1 and 2 are top plan views of product management systems, according to various embodiments.

FIG. 1 shows elements of a management system 10 according to an aspect of the present disclosure. In the embodiment of FIG. 1, the product management system 10 includes at least one repository or storage space 11 such as, but not limited to a warehouse, a food storage facility, a food processing facility, a clothing store, a grocery, or at least part of another commercial space. The nature of the storage space 11 may vary without departing from the scope of the present disclosure.

In some embodiments, the storage space 11 may include or be part of a cooler. In other examples, the storage space 11 may include or be part of a warehouse that has certain heat or humidity requirements, such as being kept within a certain temperature range. In addition, in various embodiments, the storage space 11 may be sized to permit forklift operators to drive product containers 32 into and out of the storage space 11, such as along the path designated by arrows in FIG. 1. In other embodiments, the storage space 11 may be sized to permit individual persons to walk into and out of the storage space 11.

While some embodiments of the present disclosure discuss the utilization of the product management system 10 in an environment based upon food, it is important to note, that the present disclosure is not limited to such an environment. For instance, the present disclosure may be used in any type of scenario that is a "first in", "first out" situation where there is an emphasis on timing such as, but not limited to, medicine, medical equipment, perishable items, consumer items with an expiration date, and seasonal items. Examples of perishable items may include toothpaste, cosmetics, and contact lenses. Seasonal items may include clothing associated with a limited duration when a fashion trend or utility may persist, holiday items, or equipment with greater utility in one particular time period but less in others. Examples of such seasonal or other equipment may include lawnmowers, ski equipment, and snow blowers. The present disclosure also contemplates that the product management system 10 of the present disclosure can be used in conjunction with adhesive storage and/or label storage facilities.

In various embodiments, a storage space 11 includes one or more receiving locations 12. If the storage space 11 includes a plurality of receiving locations 12 (as in FIG. 1), the receiving locations 12 may all be identical or two or more of the receiving locations 12 may vary in configuration.

Receiving locations 12 may represent individual product containers 32 such as a receptacle, bin, or tote. Receiving locations 12 may also represent locations such as a part of or all of a hanging location (such as for meat or clothing), a shelving location, a floor space, a table space, or a rack space. Receiving locations 12 may thus represent locations for individual products 14 or product containers 32 or a larger place or structure for holding multiple products 14 or receptacles or bins that each are configured for holding multiple products 14. The at least one receiving location 12 can thus include any type of storage unit with a perimeter and area. (See FIGS. 4A-4C).

In some embodiments, each receiving location 12 is configured to receive one or more gaylord containers, which may be a type of bulk container intended to carry multiple items and that is suitable for transport via a pallet and a forklift. Exemplary gaylord containers may have a height ranging between 24 and 48 inches in height. Exemplary gaylord containers may have length and width dimensions that similarly range between 36 and 48 inches, with exemplary dimensions including 36"×36", 40"×40", 40"×48", or 48"×48". The length and width dimensions provided above may correspond to standard pallet sizes, and other dimensions are also possible. Gaylord containers may be made of plastic, metal, cardboard, or other materials.

The product management system 10 may further include at least one display 18. In the illustrated embodiment, each receiving location 12 includes an associated display 18, but the relative number of receiving locations 12 and displays 18 may vary between embodiments. For example, a product management system 10 may include a plurality of receiving locations 12 and a single display 18.

The at least one display 18 may be LCD, LED, or any type of display or light known in the art. For example, the display 18 may include at least one of (e.g., one of or a combination of) a light, a flashing light, or a panel of multiple lights with the same or different colors. The display 18 may also include an LED or LCD screen used for showing pictures, video, numbers, barcodes, QR codes, or other images.

Each product 14 or a group of products 14 placed in a receiving location 12 may include or be associated with at least one associated smart device, such as an RFID device 28, an NFC device, an EPC device, a BLUETOOTH® device 30, or a UPC device, which may be variously configured. For example, an RFID device 28 may be directly affixed to a product 14 or to a package or case in which the product 14 is contained. The at least one RFID device 28 may be encoded with a unique identifier, thus specifically identifying the product 14, such as, but not limited to, a food product, with which it is associated. The RFID device 28 may be further encoded with additional information, which may include, but is not limited to, information regarding the product such as time, date, and lot information. In one embodiment, the product management system 10 includes a database configured to store the unique identifiers of the various products 14 or product containers 32 passing through the storage space 11. The database may associate each unique identifier with information regarding the product 14, including time and/or date information. The database, in one embodiment, may be utilized in correlation with a specific type of software that aids in the processing and/or housing of information and data. In one embodiment of the present disclosure, the information obtained from the RFID device 28 associated with at least one product may be used within a blockchain to trace the origin of a product.

In various embodiments, the RFID device 28 associated with the product 14 can be read by one or more parts of a reader system 24. The configuration of the reader system 24 may vary without departing from the scope of the present disclosure. According to some embodiments and as shown in FIG. 1, the reader system 24 may include at least one overhead RFID reader 16, which may be an overhead unit positioned at one or more specific locations within the storage facility 1. The location may be centralized within the storage space 11, or where multiple overhead RFID readers 16 are used, distributed within the storage space 11. In some embodiments, where an overhead RFID reader 16 is employed, the reader system 24 may include an xArray® RAIN RFID Gateway by Impinj, Inc. of Seattle, Washington.

In various embodiments, the one or more overhead RFID readers 16 may be configured to transmit signals to the RFID devices 28 associated with products 14 within the storage space 11 and receive return signals transmitted from each RFID device 28 within its range. The reader system 24 or the overhead RFID reader 16 may be configured to use multiple antennas to triangulate signals and thus determine the location of an RFID device 28 from which it has received a return signal. By identifying a location of an RFID device, the reader system 24 may be able to also determine the receiving location 12 where a product 14 or product container 32 is located based on physical measurements of distance from the overhead reader 16 to the various receiving locations 12 within the storage space 11. The reader system 24 may also be configured to track movement of a product 14 or product container 32 through the storage space 11, such as by periodically or continuously determining the location of an RFID tag associated with one or more products 14 as they are moved through the storage space 11. If a near field device is utilized as the smart device, then a mobile phone or other type of mobile reader known in the art could be utilized as part of the reader system 24. The reader system 24 may further include portal readers 26 that may be used to identify and track the movement of one or more products 14 and their associated RFID tag through doorways into or out of the storage space 11.

The reader system 24 may determine the state of the product 14 based at least in part on the time on one or more time measurements. For example, the reader system 24 may acquire a time of entry into the storage space 11 from a portal reader 26 or the overhead reader 16. When using the portal reader 26, the first time a particular RFID tag is detected, the system may determine that the associated products 14 have entered the storage space 11. Similarly, if the overhead reader 16 is used to determine time of entry, the first time an RFID tag is detected, the reader system 24 may determine that the time of detection is the time of first entry of the associated one or more products 14 into the storage space 11. In other embodiments, the time measurement is based on data stored or provided via the RFID tag, such as a date of initial slaughter, a date of initial meat processing, a date of brining completion, a date of fruit or vegetable harvest, a date of creation, or a date of manufacture. The date provided by the RFID tag may be compared with a current time measurement by the reader system 24 at the time a signal is received from an RFID tag, such as to determine whether a time limit for freshness has elapsed. In other embodiments, an RFID tag or other smart device may include, such as for sales of consumer products or clothing articles, other data such as: a date of initial release, an appropriate season or range of dates for use, a clothing type, a manufacturer identity, or a clothing size.

The reader system 24 may include one or more computer components such as a database, a server, a computer, a computer processor, and a memory, which may be used to perform operations disclosed here. (See FIGS. 5 and 6). Time of detection may be based on when each return signal is first received from a particular RFID device. If the overhead RFID reader 16 is provided with built-in chronograph features, the overhead RFID reader 16 itself may determine the time at which the return signal was received. Otherwise, some other component of the reader system 24, such as a server, may determine the time at which the return signal was received. Similarly, if the overhead RFID reader 16 is configured with an "on board" application loaded locally internal to its reader memory, a processing unit of the overhead RFID reader 16 may perform data evaluation. In other embodiments, some other component of the reader system 24, such as a server, may analyze the return signal or determine the time the signal is received.

The states of the product may 14 may depend on the type of product 14 being considered as well as the passage of time. For example, in a pork processing facility, four states may be utilized, including: 1) not yet ready for cutting; 2) ready for cutting for a first purpose; 3) ready for a second purpose; 4) expired. Additional or fewer states may exist depending on the specific product 14 involved, and based on available data. For example, other embodiments may base a state determination on a surface temperature measurement or internal temperature measurement of a product 14, product source, or type of meat.

In various embodiments, the first state of "not yet ready for cutting" may apply to products 14 such as pork bellies that have recently been brought into the storage space 11 for chilling, such as at a temperature between 20 degrees and 40 degrees Fahrenheit, or in some embodiments between 24 and 30 degrees Fahrenheit, or between 24 and 26 degrees Fahrenheit. The pork bellies may recently have completed processing such as brining, and may still need to be chilled to achieve a preferred texture for cutting. Without such chilling, the pork bellies may be less suitable for cutting because of one or more of softness or slipperiness, each of which may be improved through refrigeration for a period of time. The first duration may be between 0 and 18 hours, or up to 1 day, 2 days, or 3 days.

The second state of "ready for cutting for a first purpose" may include cutting of the pork or pork bellies for bacon, pork chops, ribs, or other purposes. The pork or pork bellies may be in the second state starting from the end of the first state and continuing for another 1 day, 2 days, or 3 days.

The third state of "ready for a second purpose" may apply to cutting or grinding of the pork or pork bellies for bacon bits or other purposes, such as soup, animal feed, fertilizer, or other purposes. In some embodiments, additional state categories may apply to one or more of these additional categories. For example, after the product 14 is no longer suitable for bacon bits, it may still be useful for soup for another day, and useful for animal feed or fertilizer for another five (5) days. The pork or pork bellies may be in the third state starting from the end of the first state and continuing for another one (1), two (2), three (3), five (5), or seven (7) days.

The fourth state of "disposal" or "waste" may apply after all applicable uses no longer apply. At this stage, the operator may simply need to dispose of the product 14. The fourth state may begin after the end of the third state. Where additional useful states are contemplated, the fourth state may begin after those additional useful states have ended.

In other embodiments, the reader system 24 may operate using three states. For example, if the product 14 has not been in the storage space 11 for enough time, the RFID reader system may assign a first condition or state (which may be a "not ready" condition) to the product 14. If the product 14 has been in the storage space 11 for enough time and is ready to be removed from the storage space 11, the RFID reader system may assign a second condition or state (which may be a "ready" condition) to the product 14. If the product 14 has been in the storage space 11 for longer than a prescribed maximum amount of time, the RFID reader system may assign a third condition or state (which may be a "waste" state) to the product 14.

For other embodiments involving clothing or other consumer products, a state of not-yet-ready may apply to products that have been manufactured but not yet approved for public release. For example, clothing, products, cars, electronics, consoles, computers, or computer or console games may have a specific date when they are intended to be publicly released, and may require storage before that date. For consumer products generally, a state of "of interest" or "not of interest" may apply to a particular consumer based on data such as a consumer group, past purchase history of similar or related items, a purchasing wish list, a clothing (e.g. shoe) size, manufacturer, seasonality, or sale state. Other criteria may also apply.

For food items placed in freezer storage, states of "usable" or "not usable" or "fresh" or "not fresh" may apply depending on how many hours, days, weeks, or months a food item has been placed in storage. Depending on the type of food placed in a freezer, the maximum recommended time for storage may vary anywhere between 1 and 24 months, and may have a cap at 3, 6, 9, 12, 15, 18, 21, or 24 months. Exemplary food states may be divided based on the amount of time in the freezer and the maximum recommended period for that food type. For example, a cow carcass may be allowed to stay in freezer storage for up to a year, and states such as "early", "middle", and "near expiration" may be applied to carcasses that have been in freezer storage for up to 4, 8, and 12 months, respectively. Carcasses that have been present over 12 months may be given a state of "expired".

Operation of the display 18 may be determined based on the particular state of the one or more products 14. For example, after determining the state of the product 14, the RFID reader system may transmit a signal to the display 18 that is associated with the receiving location 12 holding the product 14. The display 18 may then provide personnel with a visual indication of the state of the product 14 in the associated receiving location 12. The configuration of the display 18 and the nature of information presented by the display 18 may vary without departing from the scope of the present disclosure.

In some embodiments, the display 18 includes a plurality of differently colored lights (e.g., red, green, and yellow), with each colored light being associated with a different state of the product 14. In another embodiment, the display 18 includes a light configured to alternately display a plurality of different colors, with each color associated with a different state of the product 14. In yet another embodiment, the display 18 is provided as a screen configured to generate different images, with each being indicative of a different state of the product 14.

In various embodiments, the display 18 may provide numbers or text, either in addition to the color displayed or without a particular color representation of the state. Numbers may be used as a countdown to show the time remaining in minutes, hours, or days for a particular state. Alternatively, numbers may be used as a counter to show time that has elapsed within the current state. Text may be used to explain or describe the current state, time until the next state, the next state to occur, or other useful information, such as the type of product 14 that is currently being tracked at a particular receiving location 12.

Regardless of the particular configuration of a display 18, it may be useful for informing personnel whether a product 14 is ready to be removed from the storage space 11 or how the product 14 may currently best be used, thus decreasing the likelihood that the product 14 will be improperly handled. For example, if the display 18 is configured as a light stack, a yellow light may indicate to personnel that a product 14 is still fresh, but requires further "rest" or holding in the storage space 11. A dark green light may indicate to personnel that a product 14 is ready to be removed from the storage space 11, such as for a first purpose. Where one or more additional states are being used, a light green light or other color may be used to show that a product 14 is useful for a second purpose. A red light may indicate to personnel that a product 14 has expired and is to be disposed of as waste. Different colors or signals may be provided for the states described above, and additional colors may be used if other states are being used.

In some embodiments, a display 18 may be used within or near the storage space 11 to show a table of how many products 14 or product containers 32 are at each given state within one or more receiving locations 12. For example, for some embodiments, if a receiving location 12 is a lane or aisle, the display 18 for that receiving location may indicate that the aisle includes four product containers 32 at a first state, ten product containers 32 at a second state, five containers at a third state, and two product containers 32 at a fourth state. Alternatively, a display 18 may be used to summarize the contents of the storage space 11 by identifying the number of products 14 or product containers 32 at each state for each receiving location 12 using text, numbers, and/or colors.

It should be understood that the operations, images, and systems described are merely exemplary approaches and other approaches to signaling the state or condition of a product 14 in a storage space 11 may be employed without departing from the scope of the present disclosure.

Figure 2:
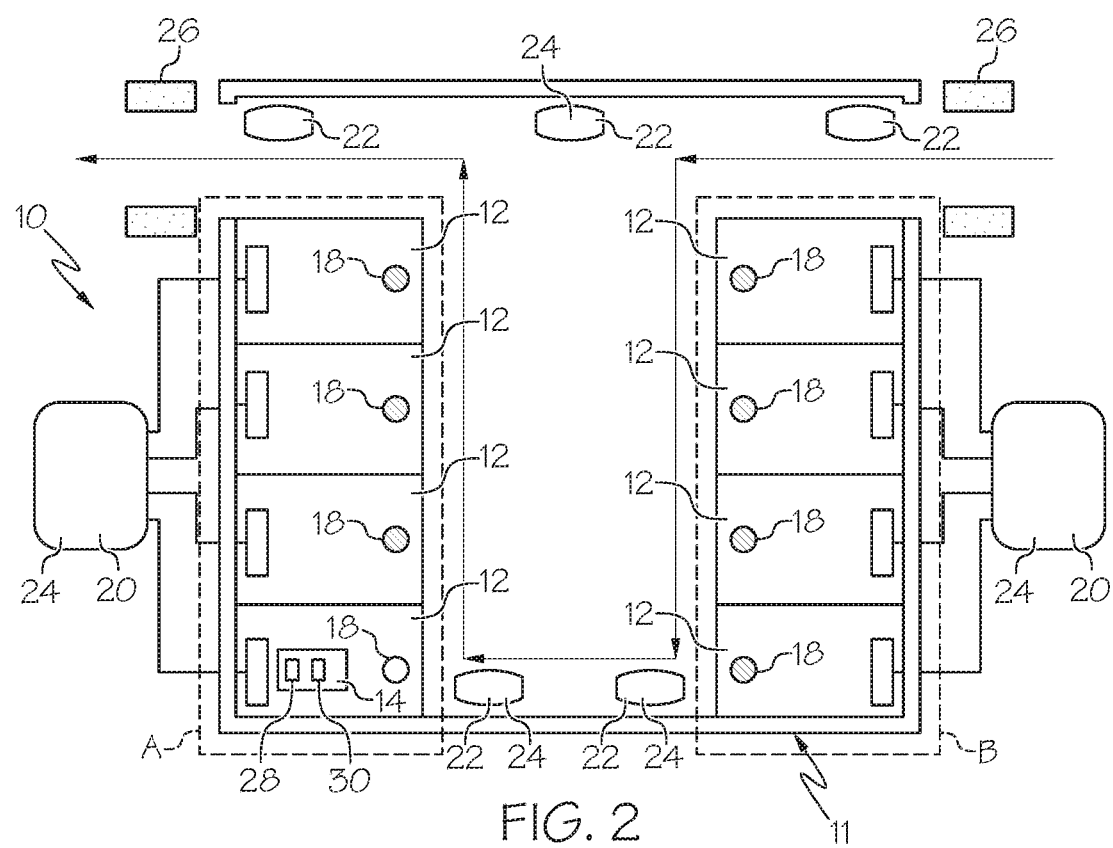

In other embodiments, such as in FIG. 2, the product management system 10 may employ a plurality of RFID readers 20, rather than a single overhead RFID reader 16. In the embodiment of FIG. 2, each RFID reader 20 is positioned within the vicinity of and/or coupled to a different one or more of the plurality of receiving locations 12. Each RFID reader 20 is configured to receive a return signal transmitted from an RFID device 28 within its corresponding receiving locations 12, rather than all of the RFID devices 28 in the storage space 11. For example, in the embodiments of FIG. 2, one of the RFID readers 20 is configured to interact with the RFID devices 28 of products 14 housed within any of the receiving locations 12 on the left side of the storage space 11 (e.g., section A), while the other RFID reader 20 is configured to interact with the RFID devices 28 of products 14 housed within any of the receiving locations 12 on the right side of the storage space 11 (e.g., section B). While two RFID readers 20 are shown in FIG. 2, it should be understood that any number of RFID readers 20 may be employed, with the RFID readers 20 being variously positioned within the storage space 11. All of the RFID readers 20 of an RFID reader system may be similarly configured, or at least two of the RFID readers 20 may be differently configured.

In some embodiments, the RFID readers 20 are configured to receive a return signal from an RFID device 28 positioned at their corresponding receiving locations. The reader system 24 can use one or more time measurements to determine a state of each product 14 or product container 32 as described above. The reader system 24 can then transmit a signal to the display 18 associated with the receiving location 12 in which the product 14 associated with the RFID device 28 is received to provide a visual indication of the state of the associated products 14, as described above. If a product 14 is moved from a position within the range of one of the RFID readers 20 to a position within the range of another one of the RFID readers 20, the reader system 24 may keep track of where the RFID device 28 associated with the product 14 was last "seen," thus tracking movement of the product 14 through the storage space 11.

In some embodiments, BLUETOOTH® readers 22 provide additional tracking capability for determining locations or movement of one or more of products 14, product containers 32, personnel, vehicles, or other equipment. Each BLUETOOTH® reader 22 may have a range of up to 4 meters, and may be used individually or in combination with other BLUETOOTH® readers 22 to identify position and/or movement of BLUETOOTH® devices 30.

For example, FIG. 2 illustrates a reader system 24 that includes and is capable of communicating with a plurality of low power BLUETOOTH® readers 22 positioned at one or more locations within the storage space 11. The BLUETOOTH® readers 22 may each be configured to identify BLUETOOTH® devices 30 that appear within range, and may be able to identify an angle of arrival for incoming signals, which in turn may allow real-time triangulation or position estimation for nearby BLUETOOTH® devices 30. For example, BLUETOOTH® readers 22 may be positioned at doorways or other positions where movement will occur within range, which thus may allow detection or tracking of BLUETOOTH® devices 30. BLUETOOTH® readers 22 may be placed to provide full coverage of an area for continuous tracking, or they may be located at key points to allow tracking of time of entry and time of exit from a particular area.

Combining RFID and BLUETOOTH® technologies may provide additional benefits, such as enabling operation of a real time location system capable of constant monitoring of each receiving location 12 and the product 14 located in that receiving location 12. For example, one or more products 14 or product containers 32 may include either an RFID device 28 or a BLUETOOTH® device 30. Tracking may be performed by the system based on the most recent sensor read, and priority may be given for either the RFID readers 20 or the BLUETOOTH® readers 22. In other words, for reads occurring for one system or the other within a given time period, one system or the other may be selected as preferred for handling conflicts, possibly based on reliability or accuracy. In some embodiments, the RFID readers 20 may be given priority.

In some embodiments, material-handling equipment may be provided with RFID readers 20 and use the BLUETOOTH® system for equipment location with a facility. The system may therefore not only track and trace not only food products, but also how work is performed in the facility in terms of movement of food products by personnel. Personnel tracking may include monitoring the time required to complete a given task, which may provide a basis for improving work flow.

In some embodiments of the present disclosure, the product management system 10 can be utilized in a produce and/or meat handling environment. For instance, groceries, shippers, and growers of produce place a great amount of importance on freshness and quality of product. In another embodiment, the product management system 10 can be used to manage products in the fashion industry, which involves considerable change in the value or utility of goods over different time periods. For instance, over a period of weeks or months, changes may occur in popularity for any given style, and seasonal changes regularly alter whether a particular clothing item is useful or inappropriate.

Figure 3A:
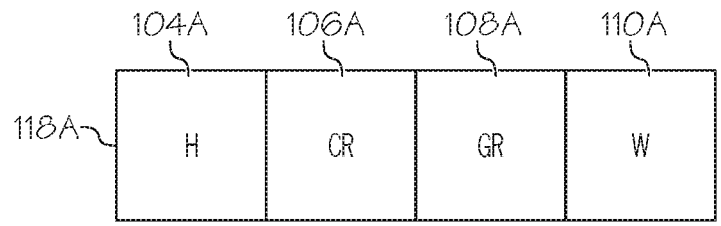
FIGS. 3A, 3B, and 3C are illustrations of exemplary display formats, according to various embodiments.
Figure 3B:
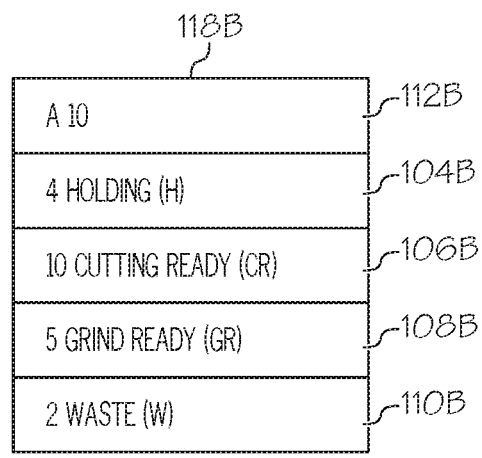
Figure 3C:
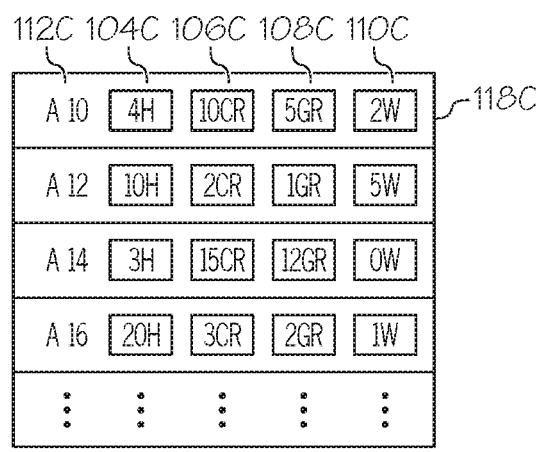

FIGS. 3A, 3B, and 3C are illustrations of exemplary display 18 formats, according to various embodiments.

These display 18 formats may be used for physical signs that operate with lights, display monitors that present an image generated by a computer processor, or user interfaces for smart phones, tablets, or computers.

FIG. 3A may represent a light stack of four lights placed side-by-side representing different state indicators. As shown, FIG. 3A includes a first state indicator 104A, a second state indicator 106A, a third state indicator 108A, and a fourth state indicator 110A. The number of state indicators may range between 1 and 20, and additional state indicators may be used as needed depending on the number of states being tracked. The display 118A of FIG. 3A may be composed of four separate lights or a screen that can show an image of four separate lights. In some embodiments, the display 118A may include a single light (e.g., LED, fluorescent, or incandescent) or a screen (e.g., LED or LCD) that operates to illuminate in different colors to represent different states. The display 118A of FIG. 3A may be mounted on or suspended from a wall, a shelf, a floor, a ceiling, a product container 32, a product 14, or a pole or other support. In other embodiments, a light stack may include a vertical, circular, irregularly arranged, annularly arranged, nested, and/or other arrangement of lights or display images.

FIG. 3B includes a display 118B that identifies a receiving location 112B and a collection of state indicators at that receiving location. FIG. 3B includes a first group state indicator 104B that shows how many items, such as products 14 or product containers 32, are at the first state. The number shown may correspond to a number of RFID devices that have been determined through real-time-location to be at the receiving location 112B, and each RFID device 28 may in turn correspond to one product 14, one product container 32, or another associated item or group of items. Similarly, the second group state indicator 106B, the third group state indicator 108B, and the fourth group state indicator 110B may display the number of products 14 or product containers 32 that are at the receiving location 112B and are at the second, third, or fourth states, respectively.

FIG. 3C includes a display 118C that includes a receiving location group 112C that lists a group of receiving locations 12. These receiving locations 12 may be grouped together for various reasons. For example, the receiving location group 112C may include all items (e.g., RFID devices 28, BLUETOOTH® devices 30, products 14, and/or product containers 32) within the storage space 11. Other groupings may be based on items associated with a particular RFID reader 20, a particular operator, or a particular type of product 14. For example, types of products 14 may be grouped by a meat type, a clothing type, a toy type, a Brand name, a manufacturer, a size range, a weight range, or other categories.

FIG. 3C also includes a first group state indicator 104C, a second group state indicator 106C, a third group state indicator 108C, a fourth group state indicator 110C. These may respectively indicate the number of items at a corresponding receiving location 12 within the receiving location group 112C that are at a first state, a second state, a third state, or a fourth state. Again, the number of states and corresponding state indicators may vary between embodiments.

Figure 4A:
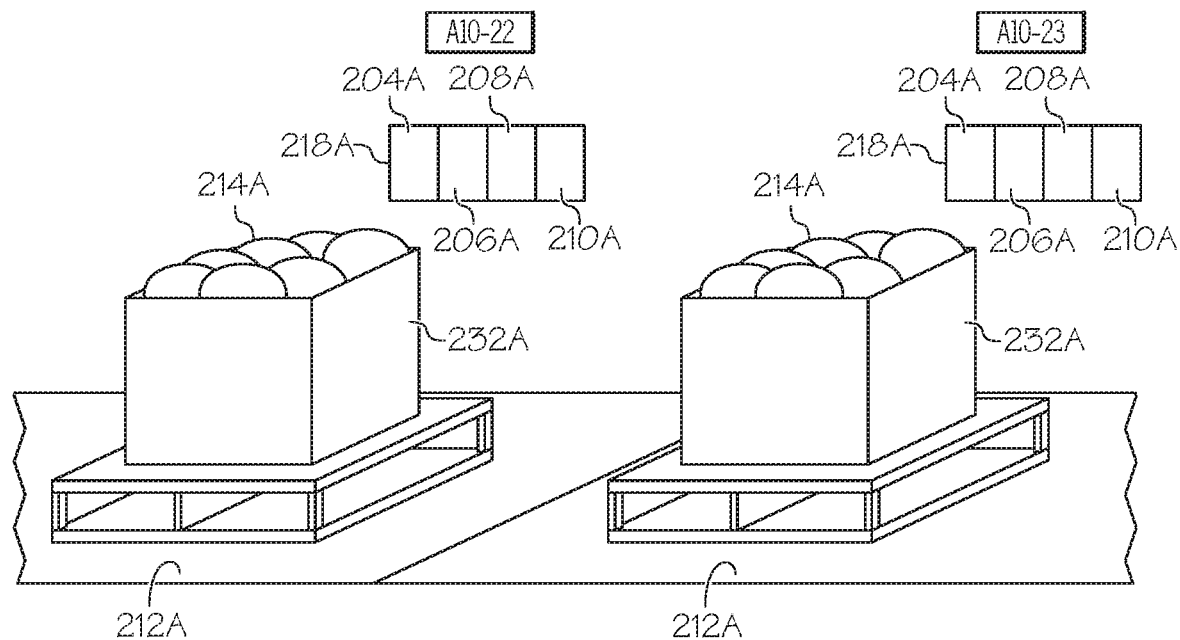
FIGS. 4A, 4B, and 4C are illustrations of exemplary receiving locations or parts of receiving locations, according to various embodiments.
Figure 4B:
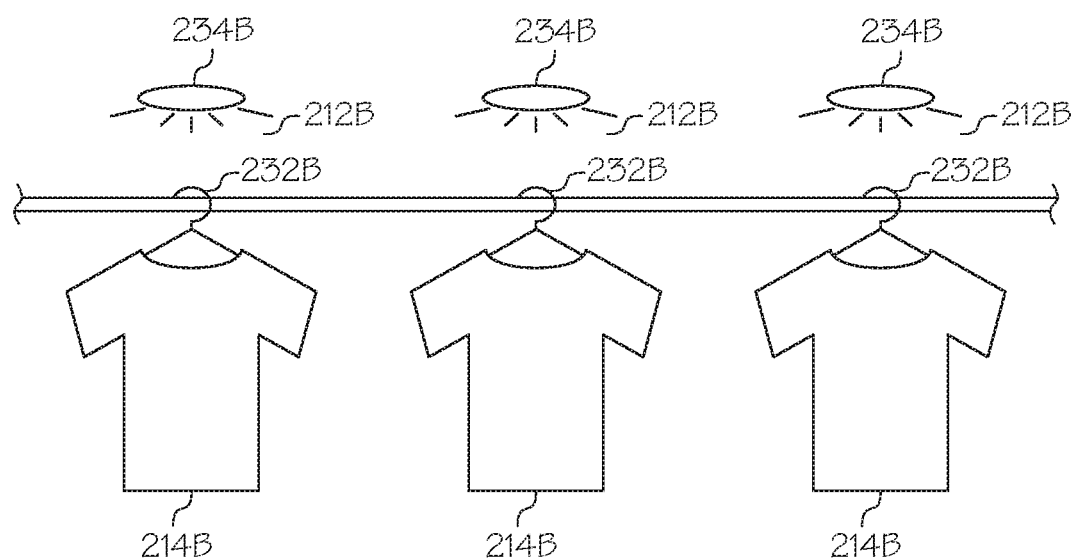
Figure 4C:
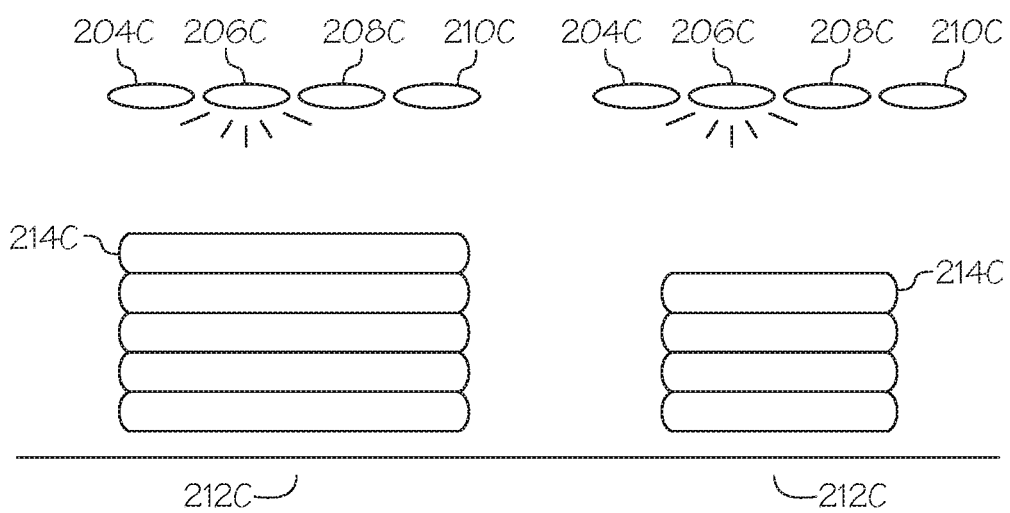

FIGS. 4A, 4B, and 4C are illustrations of exemplary receiving locations 212A or parts of receiving locations 12, according to various embodiments. For example, FIG. 4A is an illustration of a floor space or row of items designated for product containers 232A such as gaylord boxes, which may be transported via pallets. Each gaylord box may contain multiple products 214A such as pork bellies, which may need to be chilled prior to cutting for various purposes.

Each receiving location 212A may be associated with a display 218A that includes a first state indicator 204A, a second state indicator 206A, a third state indicator 208A, and a fourth state indicator 210A. The corresponding state indicator may be illuminated depending on the state of the products 214A in the product container 232A.

FIG. 4B is an illustration of a receiving location 212b for receiving items that are hung or suspended. As shown, FIG. 4B includes a product container 232b such as a hook or hangar that suspends a product 214B, such as a clothing article. In other embodiments, the suspended product 214B may include meat for chilling or freezing. FIG. 4B also includes an individual state indicator 234B.

In some embodiments, a single individual state indicator 234B with one color or display mode may be sufficient to guide a user or operator to a given location. For example, a user looking for a particular size item may need to limit the scope of their search to reduce the amount of time spent looking for a particular article of clothing. A product management system 10 may be made aware of the particular size item that is appropriate for a particular user, whether by direct user input by a salesperson, selection by the user via an app, or automatically, such as through obtaining predetermined information from a user profile associated with or stored on a user ID card (e.g., an RFID device 28 or a BLUETOOTH® device 30). The product management system 10 may then be able to identify the user's location through manual entry or automatically, such as via an overhead RFID reader 16 and/or a BLUETOOTH® reader 22. The product management system 10 may then be capable of highlighting, spotlighting, or otherwise identifying products 14 that satisfy a state criterion of being "present" and "in the right size."

In other embodiments, the individual state indicator 234B may have different display formats for demonstration of different state. For example, for the scenario described above, various state indicators that a user may be interested in may include sale state, type of clothing, and appropriate fit. Type of clothing may range from outerwear, footwear, tops, children's clothing, or other categories.

The signal provided by the individual state indicator 234B may include the use of different colors for different state indicators, and may also vary in frequency. For example, a user interested in shoes on sale in the proper fit may be given a yellow light over appropriate items based on a product 14 state and presence of the user in proximity to the product 14. The state indicator 234B may shine continuously, may flash, or may change a rate of flashing based on proximity of the user to the product 14. Other variables that may be altered based on state and/or proximity may include brightness, warmth, temperature, or other lighting characteristics. Correspondingly, other individual state indicators 234B for products 14 or receiving locations that do not satisfy user criteria may also be changed to provide contrast for the user, such as by dimming or by changing to a darker color.

FIG. 4C is an illustration of an embodiment in which multiple products 14, such as folded clothing, may be stacked at a receiving location 212C, such as on a shelf. FIG. 4C includes a first state indicator 204C, a second state indicator 206C, a third state indicator 208C, and a fourth state indicator 210C. The state indicators may be mounted on a ceiling or on the bottom of another shelf, and may act to highlight, spotlight, or otherwise identify products 14 that may be of interest to a consumer. The states, colors, and lighting variables described with respect to FIG. 4B may also be applied to the products 14 and systems of FIG. 4C.

Figure 5:
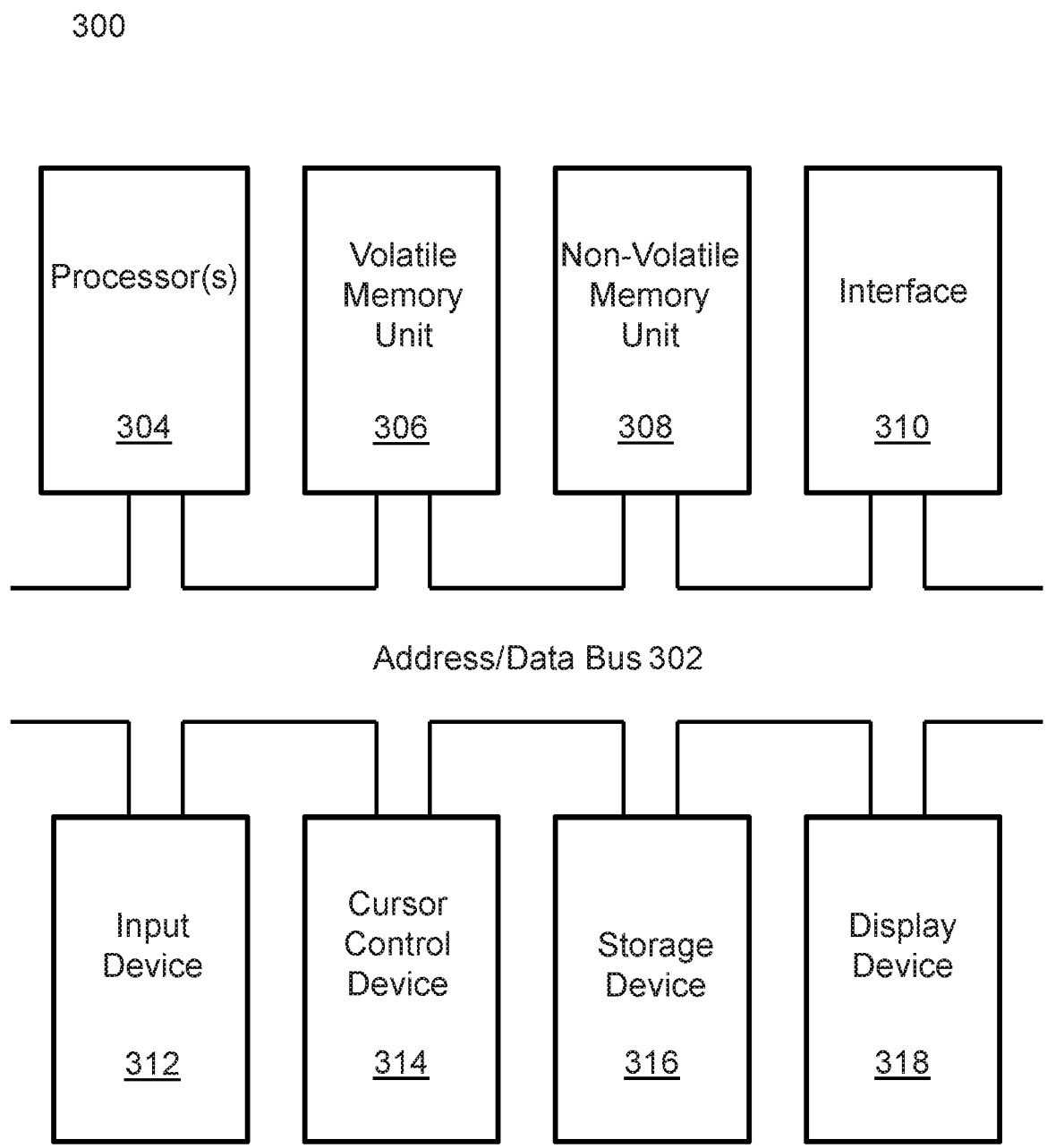
FIG. 5 is a block diagram of an exemplary computer system, according to various embodiments.
Figure 6:
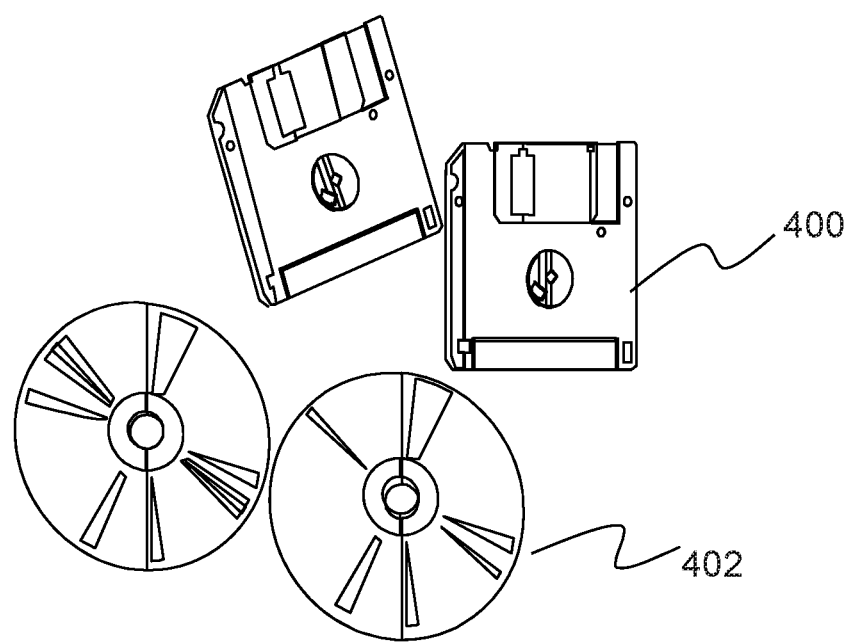
FIG. 6 are illustrative diagrams of computer program products, according to various embodiments.

A block diagram depicting an example of a system (i.e., computer system 300) that may be used to process signals and/or perform operations described in this disclosure is provided in FIG. 5. The computer system 300 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 300. When executed, the instructions cause the computer system 300 to perform specific actions and exhibit specific behavior, such as described herein.

The computer system 300 may include an address/data bus 302 that is configured to communicate information. Additionally, one or more data processing units, such as a processor 304 (or processors), are coupled with the address/data bus 302. The processor 304 is configured to process information and instructions. In an aspect, the processor 304 is a microprocessor. Alternatively, the processor 304 may be a different type of processor such as a parallel processor, application-specific integrated circuit (ASIC), programmable logic array (PLA), complex programmable logic device (CPLD), or a field programmable gate array (FPGA).

The computer system 300 is configured to utilize one or more data storage units. The computer system 300 may include a volatile memory unit 306 (e.g., random access memory ("RAM"), static RAM, dynamic RAM, etc.) coupled with the address/data bus 302, wherein a volatile memory unit 306 is configured to store information and instructions for the processor 304. The computer system 300 further may include a non-volatile memory unit 308 (e.g., read-only memory ("ROM"), programmable ROM ("PROM"), erasable programmable ROM ("EPROM"), electrically erasable programmable ROM "EEPROM"), flash memory, etc.) coupled with the address/data bus 302, wherein the non-volatile memory unit 308 is configured to store static information and instructions for the processor 304. Alternatively, the computer system 300 may execute instructions retrieved from an online data storage unit such as in "Cloud" computing. In an aspect, the computer system 300 also may include one or more interfaces, such as an interface 310, coupled with the address/data bus 302. The one or more interfaces are configured to enable the computer system 300 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 300 may include an input device 312 coupled with the address/data bus 302, wherein the input device 312 is configured to communicate information and command selections to the processor 100. In accordance with one aspect, the input device 312 is an alphanumeric input device, such as a keyboard, that may include alphanumeric and/or function keys. Alternatively, the input device 312 may be an input device other than an alphanumeric input device. In an aspect, the computer system 300 may include a cursor control device 314 coupled with the address/data bus 302, wherein the cursor control device 314 is configured to communicate user input information and/or command selections to the processor 100. In an aspect, the cursor control device 314 is implemented using a device such as a mouse, a track-ball, a track-pad, an optical tracking device, or a touch screen. The foregoing notwithstanding, in an aspect, the cursor control device 314 is directed and/or activated via input from the input device 312, such as in response to the use of special keys and key sequence commands associated with the input device 312. In an alternative aspect, the cursor control device 314 is configured to be directed or guided by voice commands.

In an aspect, the computer system 300 further may include one or more optional computer usable data storage devices, such as a storage device 316, coupled with the address/data bus 302. The storage device 316 is configured to store information and/or computer executable instructions. In one aspect, the storage device 316 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 318 is coupled with the address/data bus 302, wherein the display device 318 is configured to display video and/or graphics. In an aspect, the display device 318 may include a cathode ray tube ("CRT"), liquid crystal display ("LCD"), field emission display ("FED"), Light Emitting Diode ("LED")", plasma display, or any other display device suitable for displaying video and/or graphic images and alphanumeric characters recognizable to a user.

The computer system 300 presented herein is an example computing environment in accordance with an aspect. However, the non-limiting example of the computer system 200 is not strictly limited to being a computer system. For example, an aspect provides that the computer system 300 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product (i.e., storage device) is depicted in FIG. 8. The computer program product is depicted as floppy disk 300 or an optical disk 302 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope hereof is not limited to the above description but is as set forth in the following claims, and it is understood that claims may be directed to the features hereof, including combinations of features that are individually disclosed or claimed herein.

The invention claimed is:

1. A product management system, comprising:
    at least one receiving location configured to receive a product associated with at least one smart device encoded with a unique identifier identifying the product, the smart device being attached to a container of the product;
    a reader system configured to
        receive a first signal transmitted from the at least one smart device due to the product being received at the at least one receiving location,
        determine a time measurement by evaluating when the first signal was received from the at least one smart device,
        determine a state of the product based on the unique identifier of the product and the time measurement, wherein the state of the product indicates a processing stage of a plurality of possible process stages to be performed on the product, wherein the product management system is configured to recognize at least three different process stages, including a holding state process stage in which the product should be held for additional time before further processing, a first food product stage where the product is ready for use as a first food product type, and a second food product stage where the product is ready for use as a second food product type and is no longer ready se as the first food product type based on the time measurement, the second food product type being different from the first food product type, and
        transmit a second signal based on the state of the product; and
    at least one display associated with the product and configured to
        receive the second signal from the reader system, and
        generate a visual indication of the state of the product based at least in part on the second signal.

2. The product management system of claim 1, wherein the at least one smart device is attached to a container that comprises the product.

3. The product management system of claim 1, wherein the product management system further determines the time measurement by evaluating data stored by the at least one smart device.

4. The product management system of claim 1, wherein using the product for the first food processing stage includes cutting the product.

5. The product management system of claim 1, wherein the product management system further comprises a cooler, and wherein at least one of the states of the product includes being ready for a processing stage of cooling the product using the cooler.

6. The product management system of claim 1, wherein the at least one smart device comprises at least one of an RFID device, a Near Field Communication (NFC) device, and a BLUETOOTH® device.

7. The product management system of claim 6, wherein the at least one RFID device is encoded with information regarding the product.

8. The product management system of claim 7, wherein the information regarding the product includes at least one of time and date information.

9. The product management system of claim 1, wherein the reader system includes a database configured to store the unique identifier and to associate the unique identifier with information regarding the product.

10. The product management system of claim 1, wherein the at least one display comprises at least one of
    a plurality of differently colored lights, with each colored light being associated with a different condition of the product,
    a light configured to alternately display a plurality of different colors, with each color is associated with a different state of the product, and
    a screen configured to generate different images each indicative of a different state of the product.

11. The product management system of claim 1, wherein the reader system comprising a plurality of readers and is configured to track movement of the product associated with the smart device based on at least in part on receipt of the first signal from the smart device at different times.

12. The product management system of claim 11, wherein the plurality of readers comprising a plurality of low-power BLUETOOTH® readers positioned at one or more locations within a facility to track the movement of the product, and wherein each of the plurality of low-powered BLUETOOTH® readers is configured to receive the first signal from the smart device at different times.

13. A method of managing a product, comprising:
    using a reader system,
        receiving a first signal transmitted from a smart device associated with a product due to the product being received at a receiving location, the smart device encoded with a unique identifier identifying the product, the smart device being attached to a container of the product;
        determining a time measurement by evaluating when the first signal was received from the smart device,
        determining a state of the product based on the unique identifier of the product and the time measurement, wherein the state of the product indicates a processing stage of a plurality of possible process stages to be performed on the product, wherein at least three different process stages are recognized, including a holding state process stage in which the product should be held for additional time before further processing, a first food product stage where the product is ready for use as a first food product type, and a second food product stage where the product is ready for use as a second food product type and is no longer ready for use as the first food product type based on the time measurement the second food product type being different from the first food product type, and
        transmitting a second signal indicative of the state of the product;
    using at least one display associated with the product,
        receiving the second signal from the reader system; and generating a visual indication of the state of the product based at least in part on the second signal.

* * * * *